United States Patent [19]
Radlmann et al.

[11] 3,904,589
[45] Sept. 9, 1975

[54] POLYAMIDES WITH FREE SECONDARY AMINO GROUPS

[75] Inventors: Eduard Radlmann, Dormagen-Hackenbroich; Jurgen Schramm; Gunther Nischk, both of Dormagen, all of Germany

[73] Assignee: Bayer Aktiengesellschaft, Leverkusen, Germany

[22] Filed: Sept. 3, 1974

[21] Appl. No.: 502,890

[30] Foreign Application Priority Data
Sept. 12, 1973 Germany............................ 2345876

[52] U.S. Cl.......... 260/78 A; 260/78 L; 260/78 SC; 264/176 F
[51] Int. Cl............................................. C08g 20/10
[58] Field of Search................ 260/78 A, 78 L, 78 P

[56] References Cited
UNITED STATES PATENTS

| | | | |
|---|---|---|---|
| 3,438,948 | 4/1969 | Pietrusza et al. | 260/78 A |
| 3,689,457 | 9/1972 | Rio | 260/78 A X |

*Primary Examiner*—Lucille M. Phynes
*Attorney, Agent, or Firm*—Plumley & Tyner

[57] ABSTRACT

This invention relates to high-molecular weight linear polyamides which comprise structural units derived from lactams and/or salts of diamines with dicarboxylic acids and additionally structure units derived from salts of diamines with N-monoalkylated 5-aminoisophthalic acids. Such novel polyamides with functional secondary amino groups in the side chain are capable of secondary reactions on the polymer, e.g. dyeing with reactive dyes, controlled cross-linking reactions or other surface reactions.

4 Claims, No Drawings

POLYAMIDES WITH FREE SECONDARY AMINO GROUPS

This invention relates to high-molecular, linear copolyamides which contain free secondary amino groups and which may be obtained by solvent-free condensation of N-monoalkylated 5-aminoisophthalic acids with aliphatic diamines and lactams or salts of aliphatic dicarboxylic acids with aliphatic diamines, and to filaments and fibres produced therefrom.

It is known that triamines or aminodicarboxylic acids which contain primary and/or secondary amino groups give rise to crosslinking reactions in polyamide-forming systems, such as salts of diamines with dicarboxylic acids or lactams, so that the resulting polymers are infusible and insoluble.

It has now surprisingly been found that N-monoalkylated 5-aminoisophthalic acids may be condensed with the equivalent quantity of a diamine without any signs of crosslinking with lactams or salts of diamines with dicarboxylic acids to yield high-molecular weight, linear polyamides which contain up to 500 mval of secondary amino groups per kg and which may be worked-up from the melt. Such novel copolyamides with functional secondary amino groups in the side chain are capable of secondary reactions on the polymer, e.g. dyeing with reactive dyes, controlled crosslinking reactions or other surface reactions.

This invention therefore relates to novel high-molecular weight linear polyamides which comprise structural units corresponding to at least one of the following general formulae:

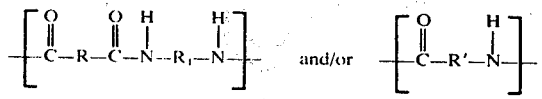 and/or 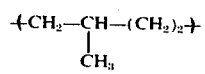

and structural units corresponding to the general formula

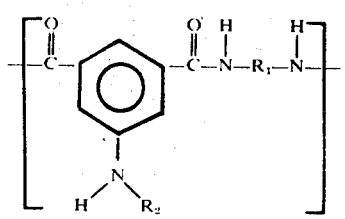

wherein
R represents an alkylene group containing from 4 to 12 carbon atoms;
R' represents an alkylene group containing from 4 to 12 carbon atoms;
$R_1$ represents an alkylene group containing from 4 to 12 carbon atoms or a $C_6$ to $C_8$ cycloalkylene group; and
$R_2$ represents a straight- or branched-chain alkyl group containing from 1 to 10 carbon atoms or a $C_6$ to $C_8$ cycloalkylene group,
and that they contain free secondary amino groups in amounts of up to 500 mval/kg of polyamide and have a relative solution viscosity of from 1.1 to 3.5 (determined on solutions of 1 g polyamide in 100 ml m-cresol at 25°C).

More particularly the invention relates to high molecular weight linear polyamides which comprise structural units corresponding to at least one of the following general formulae:

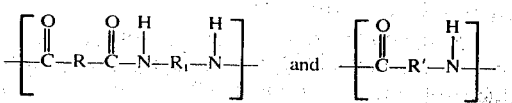 and 

and structural units corresponding to the general formula

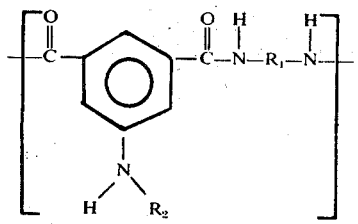

wherein
R represents a member selected from the group consisting of $-(CH_2)_4-$, $-(CH_2)_6-$, $-(CH_2)_7-$, $-(CH_2)_8-$ and $-(CH_2)_{10}-$;
R' represents a member selected from the group consisting of $-(CH_2)_4-$, $-(CH_2)_5-$, $$-(CH_2-CH-(CH_2)_2-)-$$
$$\phantom{xxx}|$$
$$\phantom{xxx}CH_3$$

and $-(CH_2)_{11}-$;
$R_1$ represents a member selected from the group consisting of $-(CH_2)_5-$ and $-(CH_2)_6-$ and
$R_2$ represents a radical selected from the group consisting of methyl, ethyl, iso-propyl, propyl, butyl, iso-butyl and cyclohexyl,
and which contain free secondary amino groups in amounts of up to 500 mval/kg of polyamide and have a relative solution viscosity of from 1.1 to 3.5 (determined on solutions of 1 g of polyamide in 100 ml m-cresol at 25°C).

These polyamides which are modified with secondary amines may be prepared by polycondensing:
a. a stoichiometric mixture of dicarboxylic acid corresponding to the following general formula:

and a diamine corresponding to the following general formula:

$$H_2N - R_1 - NH_2$$

or the corresponding salt corresponding to the following general formula

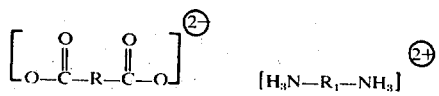

wherein
R and $R_1$ are as defined above; and/or
b. a lactam corresponding to the following general formula:

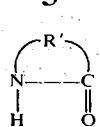

wherein R' is as defined above; with c. a N-monoalkylated 5-aminoisophthalic acid or a derivative thereof corresponding to the following general formula:

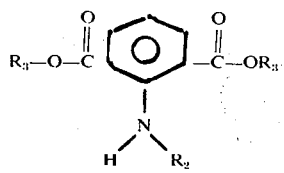

wherein $R_2$ is as defined above; and $R_3$ represents a hydrogen atom or an alkyl group containing from 1 to 5 carbon atoms; and a stoichiometric amount of a diamine corresponding to the following general formula:

wherein $R_1$ is as defined above;

in a solvent-free reaction mixture at temperatures of from 100° to 300°C in an inert gas atmosphere at pressures of from atmospheric up to 0.001 Torr and in such proportions that the concentration of free secondary amino groups is from 1 to 500 mval/kg of polyamide.

The polyamides with free secondary amino groups obtained in this way are eminently suitable for the production of shaped products, particularly filaments and sheets, from the solvent-free melt.

The N-monoalkylated 5-aminoisophthalic acids and derivatives thereof used for preparing the novel polyamides according to the invention may be obtained in high yields and with high fibre quality by conventional processes involving the condensation of 5-aminoisophthalic acid esters with suitable aldehydes or ketones and hydrogenation of the resulting Schiff's bases.

The following compounds are examples of such isophthalic acid derivatives:

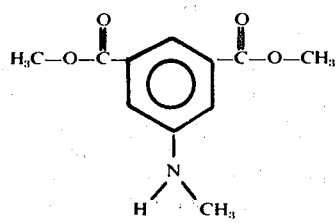

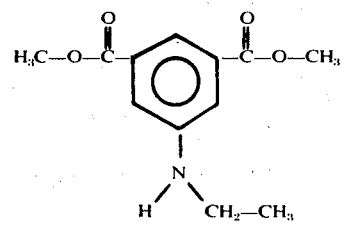

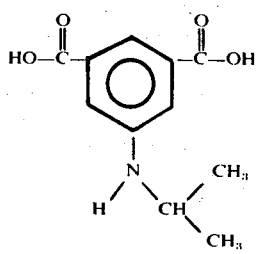

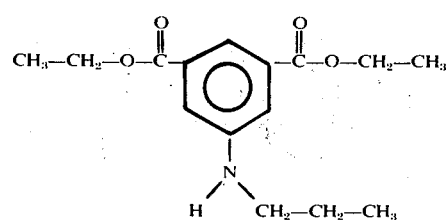

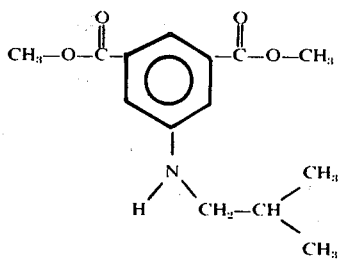

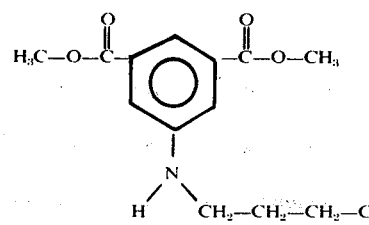

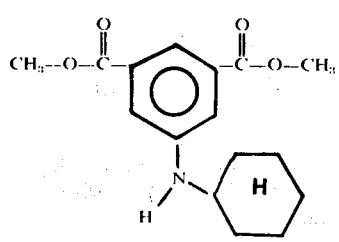

The preparation of the dimethyl ester of 5-ethylaminoisophthalic acid by the reaction of the dimethyl ester of 5-amino-isophthalic acid with acetaldehyde, followed by hydrogenation in the presence of a nickel catalyst has been described in Belgian Patent Specification No. 625 137, (see Chem. Abstr. Vol. 60, 702 et.-seq. (1964)). This method of synthesis may be further simplified by starting with the nitroisophthalic acid or an ester thereof and carrying out the reduction to the amino compound and the alkylation in a single step.

In another process, 4-methylamino-isophthalic acid esters or methylamino-terephthalic acid may be prepared by methylating the corresponding amino compounds with dimethyl sulphate, (see Beilsteins Handbuch der Organischen Chemie, Volume 14 I, 634, 637). From a technical point of view, the first mentioned method of reductive alkylation is, of course, preferable.

Preparation of 5-methylamino-isophthalic acid dimethyl ester:

418 g (2 mol) 5-amino-isophthalic acid dimethyl ester were suspended in 1.5 l dioxane and then hydrogenated on a Raney-Nickel catalyst at 110°C and a hydrogen pressure of from 60 to 100 excess atmospheres after the addition of 2.2 mol formaldehyde (in the form of a methanolic solution). After the addition of a further 500 ml dioxane, the reaction mixture was filtered hot to remove the nickel catalyst and the filtrate was then concentrated by evaporation. When cold, the crystalline reaction product was filtered under suction, washed with methanol and dried under vacuum.

Yield: 343 g 5-methylamino-isophthalic acid dimethyl ether Mp. 153° to 155°C, yield = 77 % of the theoretical yield, based on the quantity of 5-amino-isophthalic acid dimethyl ester used as starting material.

A sample of the substance had a melting point of 157 to 158°C after recrystallisation from methanol.

Elementary analysis:
Calculated: C, 59.15; H, 5.9; N, 6.3; O, 28.65.
Found: C, 59.1; H, 5.7; N, 6.9; O, 27.9.

The IR spectrum confirmed the structure.

The following compounds were prepared by analogous methods:

5-isobutylamino-isophthalic acid dimethyl ester, Mp. 103°–105°C;
5-cyclohexylamino-isophthalic acid dimethyl ester, Mp. 116°–118°C;
5-isopropylamino-isophthalic acid dimethyl ester, Mp. 128°–130°C.

Preparation of 5-isopropylamino-isophthalic acid:

20 ml glacial acetic acid are added to 217 g (1 mol) 5-aminoisophthalic acid dihydrate and 70 g (1.2 mol) acetone in 1 l methanol, and hydrogenation is carried out in the presence of a Raney-Nickel catalyst at from 100° to 110°C under a hydrogen pressure of 60 excess atmospheres. After removal of the catalyst, the volume of the reaction mixture was reduced by half by evaporation, a small quantity of unreacted starting material was filtered off, and the product was obtained in a crystalline form by further concentration. After recrystallisation from water/ethanol, the yield was 81 g 5-isopropylamino-isophthalic acid, Mp. 284° to 185°C, yield = 36.4% of the theoretical yield, based on the quantity of 5-amino-isophthalic acid dihydrate used as starting material.

An analytical sample had a melting point of 295° to 296°C after recrystallisation from dioxane.

Nitrogen analysis: % N claculated: 6.25 found: 6.2 and 6.1.

The IR spectrum confirmed the structure.

5-isobutylamino-isophthalic acid, Mp. 249° to 251°C, was prepared in an analogous manner. Preparation of 5-n-butylamino-isophthalic acid dimethyl ester: 478 g (2 mol) 5-nitro-isophthalic acid dimethyl ester and 180 g (2.5 mol) n-butyraldehyde in 1.5 l methanol were hydrogenated in the presence of a Raney-Nickel catalyst at from 50° to 60°C and a hydrogen pressure of from 40 to 60 excess atmospheres after the addition of 20 ml glacial acetic acid. After dilution with a further 500 ml methanol, the reaction mixture was filtered hot to remove the catalyst and then concentrated by evaporation to obtain the product in a crystalline form.

Yield: 470 g 5-n-butylamino-isophthalic acid dimethyl ester Mp. 101° to 104°C, corresponding to 88.8 % of the theoretical yield, based on the quantity of 5-amino-isophthalic acid dimethyl ester used as starting material.

An analytical sample had a melting point of 103° to 105°C after recrystallisation from methanol.

Elementary analysis:
Calculated: C, 63.4; H, 7.2; N, 5.3; O, 24.1.
Found C, 62.8; H, 6.1; N, 5.8; O, 24.8.

The IR spectrum confirmed the structure.

The following were prepared in an analogous manner:

5-n-propylamino-isophthalic acid dimethyl ester, Mp. 107°–110°C;
5-cyclohexylamino-isophthalic acid dimethyl ester, Mp. 116°–118°C.

Suitable aliphatic dicarboxylic acids are those with from 6 to 14 carbon atoms, in particular adipic acid, suberic acid, azelaic acid, sebacic acid or decane-1,10-dicarboxylic acid.

Among the diamines with from 4 to 12 carbon atoms which may be used for the process, pentamethylene-1,5-diamine, hexamethylene-1,6-diamine are particularly suitable and also a diamine such as 1,4-bis-(aminomethyl)-cyclohexane is used to obtain the product of this invention.

The lactams which are suitable for co-condensation include all those with from 5 to 13 carbon atoms, in particular ε-caprolactam, δ-methyl-caprolactam and lauric lactam.

According to a preferred embodiment of the invention, polycondensation is carried out by melting the mixture of components under a stream of an inert gas, such as nitrogen, and heating to temperatures above 200°C, with stirring. The pressure is then reduced, generally to below 15 Torr and preferably below 1 Torr. Polycondensation is carried out for from 15 minutes to 10 hours under these conditions until the desired viscosity is reached. The melt may then be worked-up immediately into shaped products, such as filaments or sheets.

The dicarboxylic acids and diamines are preferably used in equivalent quantities although one of these components may also be used in excess for the purpose of limiting the molecular weight.

The novel polyamides are distinguished by their good colour in the unbleached, undyed state, good thermal and mechanical properties and excellent processing qualities. Owing to the presence of the free secondary amino groups, they are eminently suitable for dyeing with reactive dyes to deep tones which have a high resistance to perspiration, water, light and boiling. In addition, the shaped products are capable of undergoing a wide variety of surface reactions, e.g. addition of alkylene oxides, particularly ethylene oxide, to render them hydrophilic or crosslinking reactions with polyfunctional acid chlorides or formaldehyde.

The relative solution viscosities $\eta_{rel.}$ quoted in the following Examples were determined at 25°C on solutions of 1 g of substance in 100 ml m-cresol.

The following Examples are to further illustrate the invention without limiting it.

EXAMPLE 1

A mixture of 50.0 parts, by weight, 5-isobutylaminoisophthalic acid dimethyl ester,

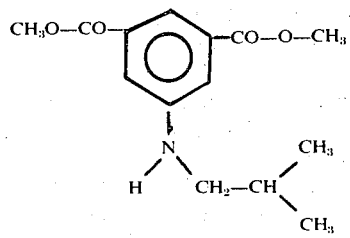

21.8 parts, by weight, hexamethylene diamine, 910.3 parts, by weight, ϵ-caprolactam and 30.0 parts, by weight, ϵ-aminocaproic acid is melted in a polycondensation apparatus under a stream of nitrogen and heated to 275°C within 2½ hours with through mixing. Condensation is carried out under these conditions for 6 hours. The highly viscous, colourless melt is then spun through a water bath to produce threads which are then granulated. The granulate is extracted with water and dried in a tumbler drier at 100°C. The polyamide has the following properties after this treatment:

| | |
|---|---|
| Melt viscosity at 260°C: | 2210 Poises |
| Relative viscosity: | $\eta rel. = 2.655$ |
| Softening range: | 211 to 216°C |
| Concentration of secondary amino groups: | 185 mval/kg |

The polyamide may be worked-up into foils and filaments.

EXAMPLE 2

A mixture of 100.0 parts, by weight, dimethyl 5-propylamino-isophthalate, 46.2 parts, by weight, hexamethylene diamine, 845.3 parts, by weight, ϵ-caprolactam and 30.0 parts, by weight, ϵ-aminocaproic acid is melted under a stream of nitrogen in a polycondensation apparatus heated to 270°C with vigorous mixing in the course of 3 hours and then condensed for 6½ hours. The almost colourless, highly viscous melt is converted into a granulate and extracted with water as described in Example 1. The dried shavings have the following properties:

| | |
|---|---|
| Melt viscosity at 260°C: | 2622 poises |
| relative viscosity: | $\eta rel = 2.704$ |
| softening range: | 198 to 208°C |
| concentration of secondary amino groups: | 399 mval/kg |

The material may be worked-up into sheets and filaments from the melt.

EXAMPLE 3

A mixture of 100.0 parts, by weight, 5-isopropylaminoisophthalic acid dimethyl ester, 46.2 parts, by weight, hexamethylene diamine and 1020.0 parts, by weight, hexamethylene diammonium adipate is melted in a polycondensation apparatus under a stream of nitrogen, heated to 300°C within 1 hour, with stirring, and condensed for 2½ hours. The colourless, highly viscous melt is then spun, granulated and extracted with water as described in Example 1. The copolyamide has the following properties:

| | |
|---|---|
| Melt viscosity at 280°C: | 2895 Poises |
| Relative viscosity: | $\eta rel. = 2.873$ |
| Softening range: | 249 to 255°C |
| Condensation of secondary amino groups: | 398 mval/kg |

The granulate may be worked-up into filaments and sheets from the melt.

EXAMPLE 4

145.5 parts, by weight, 5-cyclohexylaminoisophthalic acid dimethyl ester, 58.0 parts, by weight, hexamethylene diamine, 30.0 parts, by weight, ϵ-aminocaproic acid and 802.6 parts, by weight, ϵ-caprolactam are melted in a polycondensation apparatus under a stream of nitrogen and then heated to 270°C in the course of 1 hour, with stirring, and condensed for 10½ hours. The colourless, highly viscous melt is worked-up into a granulate, extracted with water and dried as described in Example 1. The copolyamide has the following properties:

| | |
|---|---|
| Melt viscosity at 260°C: | 2793 Poises |
| Relative viscosity: | $\eta rel. = 2.611$ |
| Softening range: | 170 to 175°C |
| Concentration of secondary amino groups: | 500 mval/kg |

The granulate may be worked-up into filaments and sheets from the melt.

What we claim is:

1. High molecular weight linear polyamides which comprise structural repeating units of at least one of the following formulae

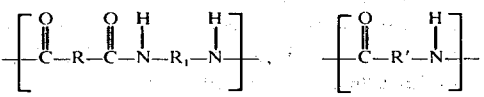, and

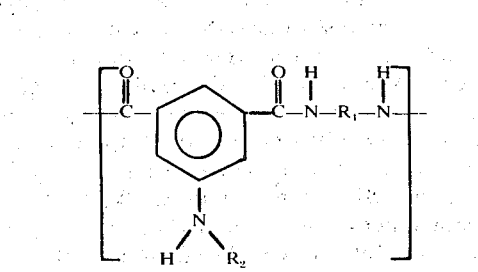

wherein

9

R represents an alkylene group containing from 4 to 12 carbon atoms;

R' represents an alkylene group containing from 4 to 12 carbon atoms $R_1$ represents an alkylene group containing from 4 to 12 carbon atoms or a $C_6$–$C_8$ cycloalkylene group; and $R_2$ represents a straight or branched-chain alkyl group containing from 1 to 10 carbon atoms or a $C_6$ to $C_8$ cycloalkyl group;

and which contain free secondary amino groups in amounts of up to 500 mval/kg of polyamide and have a relative solution viscosity of from 1.1 to 3.5 (determined on solutions of 1 g of polyamide in 100 ml m-cresol at 25°C).

2. The high molecular weight linear polyamides of claim 1 which comprise structural repeating units of at least one of the following formulae

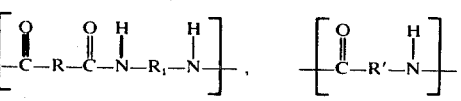
and

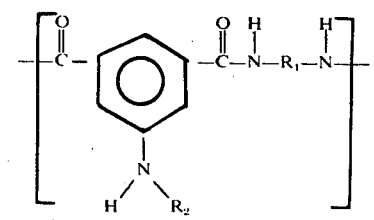

wherein

R represents a member selected from the group consisting of $+CH_2+_4$, $+CH_2+_6$, $+CH_2+_7$, $+CH_2+_8$ and $+CH_2+_{10}$ R' represents a member selected from the group consisting of $+CH_2+_4$, $+CH_2+_5$,

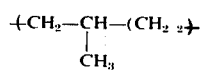

and $+CH_2+_{11}$ $R_1$ represents a member selected from the group consisting of $+CH_2+_5$ and $+CH_2+_6$ and $R_2$ represents a radical selected from the group consisting of methyl, ethyl, iso-propyl, propyl, butyl, isobutyl and cyclohexyl and which contain free secondary amino groups in amounts of up to 500 mval/kg of polyamide and have a relative solution viscosity of from 1.1 to 3.5 (determined on solutions of 1 g of polyamide in 100 ml m-cresol at 25°C).

3. Process for the preparation of high-molecular weight, linear polyamides by polycondensation of aliphatic dicarboxylic acids with aliphatic diamines and/or polymerisation of lactams, in the presence of aromatic dicarboxylic acids, wherein a. a stoichiometric mixture of a dicarboxylic acid corresponding to the following general formula:

10

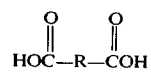

and a diamine corresponding to the following general formula:

$$H_2N—R_1—NH_2$$

or the corresponding salt corresponding to the following general formula:

wherein

R and $R_1$ are defined in claim 1; and/or b. a lactam corresponding to the following general formula:

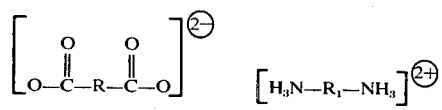

wherein

R' is as defined in claim 1;

is polycondensed with c. a N-monoalkylated 5-aminoisophthalic acid or derivative thereof corresponding to the following general formula:

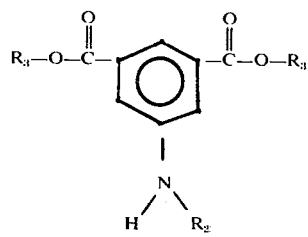

wherein $R_2$ represents a straight or branched-chain alkyl group containing from 1 to 10 carbon atoms or a cycloalkyl group; and $R_3$ represents a hydrogen atom or an alkyl group containing from 1 to 5 carbon atoms a stoichiometric quantity of a diamine corresponding to the following general formula:

$$H_2N—R_1—NH_2$$

wherein $R_1$ is as defined in claim 1, in the absence of solvents at temperatures of from 100° to 300°C in an inert gas atmosphere at pressure of from atmospheric to 0.001 Torr and in such proportions that the concentration of free secondary amino groups is in the range of from 1 to 500 mval/kg of polyamide.

4. Fibres and filaments of high-molecular weight, linear polyamides according to claim 1.

* * * * *